JEAN F. LOUIS
INVENTOR.

BY Alden D. Redfield
M. E. Frederick
ATTORNEYS

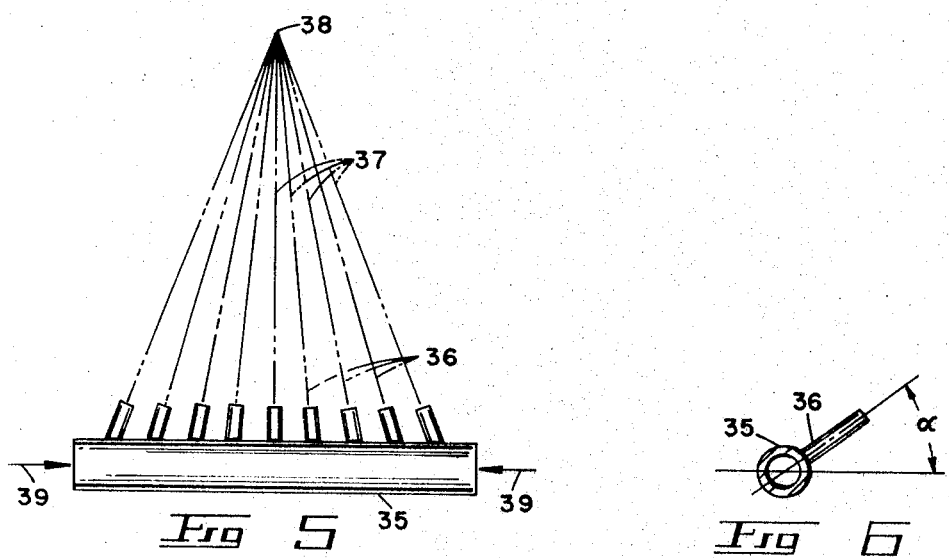
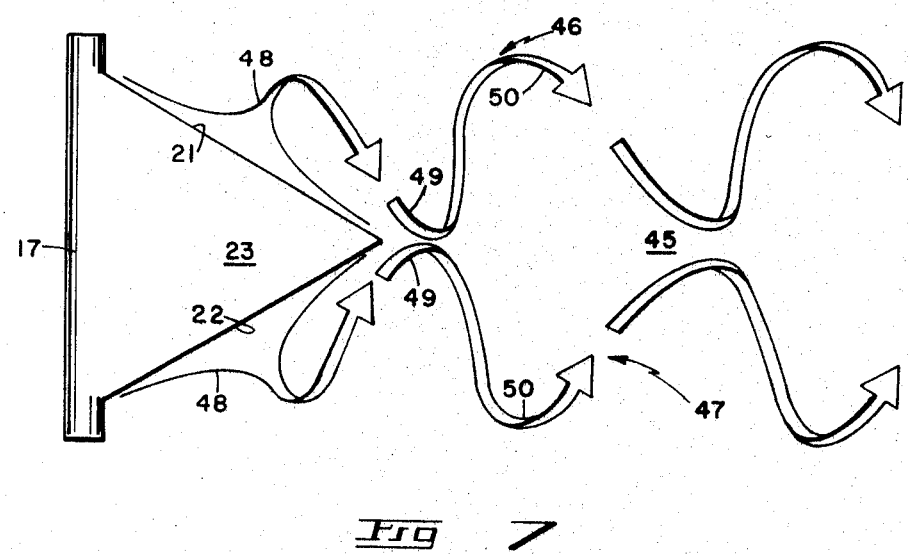

United States Patent Office 3,303,363
Patented Feb. 7, 1967

3,303,363
MEANS FOR IMPROVING THE PERFORMANCE OF ELECTRODES IN MAGNETOHYDRODYNAMIC DEVICES
Jean F. Louis, Brookline, Mass., assignor to Avco Corporation, Cincinnati, Ohio, a corporation of Delaware
Filed Nov. 23, 1962, Ser. No. 239,584
9 Claims. (Cl. 310—11)

The present invention relates generally to magnetohydrodynamic (hereinafter referred to as "MHD") devices employing a hot electrically conductive fluid or plasma, and more particularly to means for improving the performance of the electrodes of such devices.

MHD generators produce electric power by movement of electrically conductive fluid or plasma relative to a magnetic field. The plasma employed is usually an electrically conductive gas from a high temperature, high pressure source. From the source, the plasma flows through the generator and by virtue of its movement relative to the magnetic field, induces an electromotive force between opposed electrodes within the generator. The gas comprising the plasma may exhaust to a sink, which may simply be the atmosphere; or, in more sophisticated systems, the gas may exhaust to a recovery system including pumping means for returning the gas to the source. Conductivity of the gas may be produced thermally, and/or by seeding with a substance that ionizes readily at the operating temperature of the generator. For seeding purposes, sodium, potassium, cesium or an alkali metal vapor may be used. Regardless of the gas used, or the manner of seeding, the resulting gases comprise a mixture of electrons, positive ions, and neutral atoms which, for convenience, is termed "plasma."

An MHD generator of the type described normally employs a stationary magnetic field and unidirectional gas flow. As a result, such a generator is inherently a source of direct current. If alternating current is desired, some form of auxiliary equipment is usually provided to invert the direct current to alternating current.

MHD pumps use the induction motor principle, i.e., a conductive liquid is considered to be a wire or conductor suspended in a magnetic field and has a current passed through it mutually perpendicular to the length of the conductor and the magnetic field. Under these conditions, a force is induced in the conductor which tends to move it in a direction which is mutually perpendicular to the current and magnetic flux. This force, when applied to a liquid conductor, propels the liquid conductor in the same manner as a conventional pump. Such pumps have become quite common in laboratory work and in connection with the movement of liquid sodium and liquid sodium potassium in nuclear reactors. Electrodes for passing electric current through the liquid conductor within the magnetic field are located in what is generally referred to as the throat of the pump.

MHD accelerators are constructed and operate in substantially the same manner as MHD pumps, the difference being that whereas MHD pumps are generally used for pumping liquids, MHD accelerators are generally used for accelerating an electrically conductive gas.

In accordance with the present invention, the performance of electrodes in MHD devices is improved by provision of vane means, which may comprise an airfoil or a simulated airfoil for inducing a double vortex flow of fluid adjacent at least some of the electrodes. The flow of fluid in one vortex is in the opposite direction of the flow of fluid in the other vortex, the flow of fluid in both vortexes beginning at a vane being first toward the central portion of the duct, then toward the portion of the electrodes intermediate the side walls of the duct, then towards the central portion of the duct again and so on until the vortex system is dissipated.

It is therefore a principal object of the present invention to improve the performance of the electrodes in MHD devices.

It is another object of the present invention to increase the heat transfer to the electrodes of MHD devices by creating a double vortex flow which continuously brings high enthalpy fluid to the surface of the electrodes and therefore creates a large transfer of energy onto these electrodes.

It is a still further object of the present invention to continuously create a large transfer of energy onto the electrodes of an MHD generator while creating a minimum of disturbance of the boundary layer adjacent portions of the generator duct which do not contain electrodes.

A still further object of the present invention is the provision of vane means in an MHD generator for continuously bringing fluid from the high temperature central portion of the duct to the electrodes which provides a double vortex flow with minimum random turbulence associated with minimum drag.

The novel features that are considered characteristic of the present invention are set forth in the appended claims; the invention itself, however, both as to its organization and method of operation, together with additional objects and advantages thereof, will best be understood from the following description of the specific embodiment when read in conjunction with the accompanying drawings, in which:

FIGURE 5 is a top view of a manifold for providing simulated vane means;

FIGURE 6 is a side view of the manifold illustrated in FIGURE 5;

FIGURE 7 is a simplified diagrammatical illustration of the double vortex system provided by vane means in accordance with the present invention.

Figure 1:
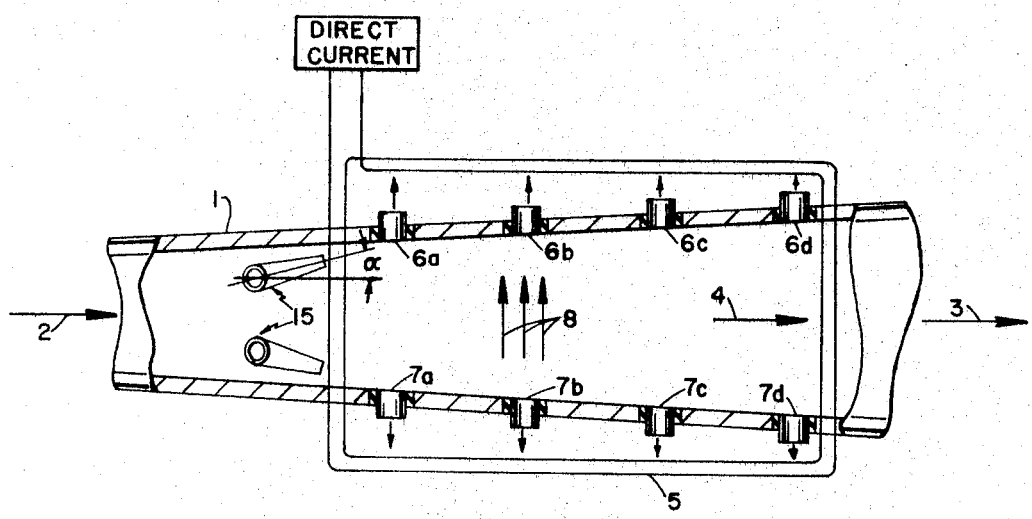
FIGURE 1 is a simplified diagrammatic illustration of an MHD generator incorporating vane means in accordance with the present invention.

A knowledge of the general principles of MHD devices will promote an understanding of the present invention. For this reason and by way of example, there is shown in FIGURE 1 a schematic diagram of an MHD generator. As illustrated in this figure, the generator comprises a tapered duct, generally designated 1, to which high temperature, high pressure, electrically conductive plasma is introduced, as indicated by the arrow at 2, and from which it exhausts, as indicated by the arrow at 3. The pressure at the exit of the duct is lower than at its inlet; and for this reason, the plasma moves at high velocity through the duct, as indicated by the arrow at 4. By properly choosing the pressure differential and shape of the duct, the plasma can be made to move through the duct at substantially constant velocity, which is desirable although not necessary to the operation of the generator. Surrounding the exterior of the duct is a continuous electrical conductor in the form of a coil 5 to which direct current may be supplied from any conventional source or from the generator itself. Flow of electrical current through the coil 5 establishes a magnetic flux through the duct 1 perpendicular to the direction of plasma flow 4 and the plane of the paper.

Within the duct are provided opposed electrodes 6a– 6d and 7a–7d. These electrodes may extend along the interior of the duct parallel to the dominant direction of plasma movement and may be positioned opposite one another in planes perpendicular to the direction of plasma movement and parallel to the direction of magnetic flux. High velocity movement of the electrically conductive plasma through the magnetic field induces a unidirectional E.M.F. between the electrodes, as indicated by the arrows at 8. The electrodes 6a–6d and 7a–7d may be connected by conductors to a load or loads (not shown) through which electrical current flows under the influence of the E.M.F. induced between the electrodes.

For efficient operation and to maintain conductivity within the plasma, the electrodes within the generator extend parallel to the dominant direction of plasma flow. Conductivity is reduced, however, by the formation of an aerodynamic boundary layer as the plasma flows past the electrodes. It is the principal purpose of the present invention to overcome this difficulty and to promote more efficient operation of the generator.

In an MHD generator current is carried by the drift of electrons and ions relative to each other, the electrons, by virtue of their much smaller mass doing most of the drifting. In most types of MHD generators, it is necessary for this current to flow from the plasma to the electrodes and then through the external load. The electrodes play much of the same part in an MHD generator as do the brushes in a conventional generator. In an MHD pump or accelerator, the current flows from an external source to the electrodes and through the fluid being pumped. If the electrodes are flush with the walls of the duct, the current of electrons and ions in the generator must flow through the aerodynamic boundary layer to reach them. Since the walls will in general be cooler than the body of the plasma, the boundary layer will in general be cooled, deionized to a greater or lesser extent, and hence a less than optimum conductor offering relatively high impedance to current flow.

Uniform thermo-emission of current by electrode surfaces is sought in MHD generators to minimize the losses by Joule and Hall effects in the immediate vicinity of the electrodes.

The thermo-emission of current by a given electrode in an MHD generator utilizing a hot electrically conductive plasma can be said to be an exponential function of temperature. For a given gas and electrode, the temperature of the surface of the electrode depends essentially on the temperature of the gas in the boundary layer adjacent the electrode. Further, since the conductivity of hot electrically conductive gases is commonly dependent on the temperature thereof, the Joule dissipation in the boundary layer is strongly dependent on the temperature of the boundary layer. From the preceding, it will now be seen that the enthalpy or temperature of the boundary layer determines the dissipation processes in the boundary layer and at the interface between the boundary layer and the electrodes; and it is advantageous for performance to maintain as high a temperature as possible in the boundary layer over the electrodes. In the development of this invention, this fact was experimentally demonstrated by changing the amount of cooling of a boundary layer incident on a given electrode; all other things being equal, the dissipation was varied by an order of magnitude. However, increasing the temperature of the boundary layer other than over the electrodes increases the heat loss through the walls of the duct without any compensating advantage which substantially equals or more than offsets the resulting decrease in the efficiency of the generator, as does the present invention.

Figures 2, 3:
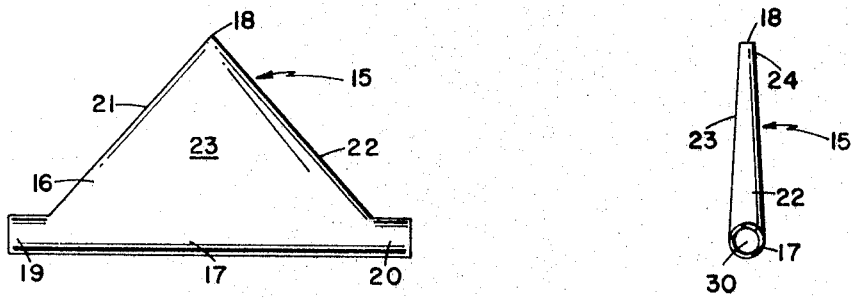
FIGURE 2 is a top view of vane means having a triangular shape.
FIGURE 3 is a side view of the vane means illustrated in FIGURE 2.
Figure 4:
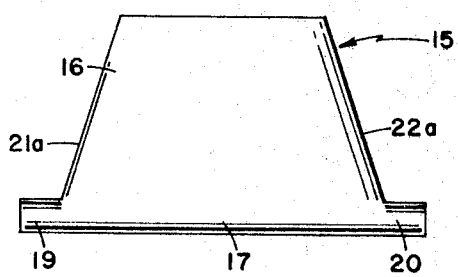
FIGURE 4 is a top view of vane means having a trapezoidal shape.

The vane means variously illustrated in FIGURES 1–6 creates a double vortex flow system which continuously brings high enthalpy gas to the surface of the electrodes and, therefore, creates a large transfer of energy onto the electrodes. Where the vanes are comprised of relatively thin and flat members, they may have a triangular shape as illustrated in FIGURE 2 or a trapezoidal shape as illustrated in FIGURE 4.

As best illustrated in FIGURE 1, the vanes 15 are set at an angle of attack α with respect to the dominant direction of plasma flow 4 to provide a maximum lift to drag ratio. The vanes 15 may be rotatably journaled in the side walls of the duct to provide an angle of attack α that varies from about a maximum of 15 degrees for low velocity flow and about 5 degrees for supersonic flow. Where a constant velocity is utilized, the vanes need not be adjustable.

As best shown in FIGURES 2–4, the vanes 15 may be comprised of a portion 16 tapered both in the thickness and width dimensions and integral with a shaft portion 17 carried by or journaled in the side walls of the duct. The vanes are normal to the plane of the electrodes and are disposed upstream of the first electrodes 6a and 7a. The tapered portion 16 of the vanes is directed downstream and towards the electrodes as shown in FIGURE 1 to provide the necessary angle of attack α. The taper in the width dimension of portion 16 provides a varying chord and this in combination with the angle of attack provides a nonuniform lift which results in the formation of the double vortex system shown in FIGURE 7.

The vanes may be mounted within the generator duct in a variety of ways other than that shown. For example, the vanes may be carried by a support (not shown) that is parallel to the plane of the electrodes. Alternately where the vanes are mounted on a shaft parallel to the direction of magnetic flux (as shown in FIGURE 1) an additional member (not shown) may be attached to the downstream end of the vane, apex 18 of FIGURE 2 for example, to hold the vane in a fixed position. Due to the lift provided by the vane, the aforementioned additional member will be in tension.

To prevent undue wear of the vanes they may be cooled in any suitable manner. If the degree of cooling is sufficient, the vanes may be made of any material such as copper or steel. However, the vanes are preferably made of a high-strength alloy having good corrosion and oxidation resistance. A suitable high-strength alloy is Inconel, which is comprised of 14% chromium, 76% nickel, 7% iron, and the balance carbon, magnesium, silicon, titanium, indium, and aluminum.

Since it is advantageous to maintain the width dimension of MHD ducts as small as possible in order to maintain the requirements for the magnet at a minimum, a single transverse vane adjacent each wall carrying electrodes is generally sufficient. If it is considered desirable, however, two or more transverse vanes adjacent one another may be used as may additional vanes in a downstream direction where the working section of the duct is longer than the effective vortex flow provided by a single set of vanes as shown in FIGURE 1.

FIGURES 2–4 show two solid vane members 15 for creating the aforementioned double vortex flow system. As shown in FIGURE 2, the vane member 15 is comprised of a shaft portion 17 the ends 19–20 of which are carried in the side walls of the duct. The shaft is integral with a tapered portion 16 in the form of a triangle intermediate the ends 19–20 of the shaft and is provided with equally convergent sides 21–22 in the thickness dimension. As best shown in FIGURE 3, the sides 23–24 in the width dimension are tapered in the direction of the apex 18.

FIGURE 4 shows a modification wherein the vane member 15 is trapezoidal in shape. The sides 21a–22a in the thickness dimension are also equally convergent but do not meet at an apex.

If desired, conventional coolant passages 30 may be provided in the vane members 15 to maintain them at a desired temperature. The coolant may be introduced under pressure at one end of the shaft portion as at 30 and after flowing through the vane member exhausted at the other end of the shaft portion.

Attention is now directed in FIGURES 5 and 6 which illustrate a manifold 35 having a plurality of spaced and coplanar ports 36 whose longitudinal axes 37 converge at a point 38. A suitable fluid, more fully described hereinafter, is supplied under pressure as represented by arrows 39 to one or both ends of the manifold 35 and exhausted through the ports 36. Upon ejection from the ports 36, the fluid simulates the solid vane previously described to create a double vortex system in the plasma. As shown in FIGURE 6, the manifold may be rotatable to provide the desired angle of lift α. To prevent any cooling effect in the plasma, the fluid exhausted from the ports 36 should be combustible. Thus, if there is sufficient oxygen in the plasma to support combustion, the fluid may be a fuel. Alternately the fluid may be comprised of a fuel combined with oxygen. Also, the fluid may be propylnitrate which with ignition and expansion burns, i.e., the fluid may be a self-burning propergol. Generally the low temperature of the fuel or the like which is supplied to the manifold 35 and exhausted through the ports 36 will be sufficient to maintain the manifold at a safe temperature. However, if desired the manifold may comprise a double wall tube wherein a coolant is passed through the interior of the manifold (but not exhausted into the duct) to remove the excess heat.

It has previously been pointed out that the vane means whether of the solid or simulated type creates a double vortex flow system. Not only is it important that the vane means provides a double vortex flow, but it is equally if not more important, that this be accomplished with the least possible resistance to fluid flow within the duct, without materially reducing the capacity of the duct and without materially increasing heat losses through the duct. Whereas prior art turbulence strips and the like for heat exchanges are designed to and do in fact function to provide maximum heat transfer to all parts of the tubes, this is undesirable in MHD devices since heat transfer through the duct represents a loss of rather significant proportions.

The double vortex system adjacent the electrodes provided by the present invention improves the performance of the electrodes without materially decreasing the capacity of the duct or materially increasing flow resistance and heat transfer through the walls of the duct other than those portions of the walls containing the electrodes.

Attention is now directed to FIGURE 7 which illustrates by way of example the double vortex flow when viewed in the direction of a wall (not shown) containing electrodes. As previously pointed out, the nonuniform lift resulting from the varying chord of the vane means results in the formation of a double vortex system 45. The strength of the double vortex system 45 is determined by the angle of attack α, rate of change of the chord and the distance of the vane means from the electrode wall. This distance of the vane means from the electrode wall should be close to the quarter height of the vane means which is to say the length of the vane means in the downstream direction. As shown in FIGURE 7, the flow of fluid in one vortex 46 is in the opposite direction of the flow of fluid in the other vortex 47, the flow of fluid in both vortexes, beginning at a vane, being first toward the central portion of the duct, as at 48, then toward the portion of the electrodes intermediate the side walls of the duct as at 49, and then towards the central portion of the duct again as at 50 and so on until the vortex system is dissipated.

In order of magnitude, the vane means should cause plasma in the central portion of the duct to flow to the boundary layer covering the electrodes in an amount equal to about three times the volume of gas that comprises the boundary layer covering the electrodes.

It will now be seen that the present invention while improving the operation of electrodes in MHD devices does not significantly disturb the boundary layer over the walls of the duct which do not contain electrodes and thus keeps heat transmission through these walls at a minimum while providing the maximum or desired amount of heat transfer to the electrodes. Further, the present invention does not create turbulence characteristic of prior art devices which have associated with them a high degree of drag, i.e., the flow of fluid in the double vortex has the minimum amount of turbulence associated with the minimum drag.

Having thus shown and described my invention, I claim:

1. In combination with an MHD device employing a duct for conveying a moving stream of hot electrically conductive fluid between opposed electrodes carried by opposed walls of said duct and through magnetic flux at said electrodes substantially normal to the plane of said electrodes and the direction of flow of said fluid, means for inducing a double vortex flow of said fluid substantially only adjacent at least some of said electrodes.

2. In combination with an MHD device employing a duct for conveying a moving stream of hot electrically conductive fluid between two sets of opposed electrodes carried by opposed walls of said duct and through magnetic flux at said electrodes substantially normal to the plane of said electrodes and the direction of flow of said fluid, means for inducing substantially only a double vortex flow of said fluid adjacent at least some of one set of said electrodes, the flow of fluid in one vortex being in the opposite direction of the flow of fluid in said other vortex and the fluid in both vortexes flowing from the central portion of said duct substantially only toward said one set of electrodes and then back toward said central portion of said duct.

3. In combination with an MHD device employing a duct for conveying a moving stream of hot electrically conductive fluid between opposed electrodes carried by opposed walls of said duct and through magnetic flux at said electrodes substantially normal to the plane of said electrodes and the direction of flow of said fluid, means providing lift from at least one side toward the center of said duct for causing a helicoidal flow of a part of said fluid from the central portion of said duct substantially only toward said electrodes and then back toward the said central portion of said duct.

4. In combination with an MHD device employing a duct for conveying a moving stream of hot electrically conductive fluid between opposed electrodes carried by opposed walls of said duct and through magnetic flux at said electrodes substantially normal to the plane of said electrodes and the said dominant direction of flow of said fluid, electrically insulated vane means adjacent at least one wall carrying said electrodes positioned at an angle of attack with respect to the dominante direction of fluid flow and shaped to provide a nonuniform lift for causing fluid from the inner portion of said duct to flow in the form of a substantially nonturbulent double vortex substantially only over the surfaces of electrodes downstream of said vane means.

5. The combination as defined in claim 4 wherein said vane means is a thin substantially flat member triangular in shape in the width dimension.

6. The combination as defined in claim 4 wherein said vane means is a thin substantially flat member trapezoidal in shape in the width dimension.

7. The combination as defined in claim 4 wherein said vane means comprises a manifold having a plurality of ports for selectively directing a fluid into said duct to provide said nonuniform lift and angle of attack.

8. In combination with an MHD device employing a duct for conveying a moving stream of hot electrically conductive fluid between opposed electrodes carried by opposed walls of said duct and through magnetic flux at said electrodes substantially normal to the plane of said electrodes and the direction of flow of said fluid, a thin substantially flat vane spaced a distance from a wall carrying said electrodes equal to about one fourth the length of said vane in the downstream direction, said vane being normal to the said plane of electrodes and having opposite sides in the thickness dimension equally convergent in the downstream direction, said vane being directed downstream and toward said electrodes to provide a maximum lift to drag ratio, and means for supporting said vane in said duct.

9. In combination with an MHD generator employing a duct for conveying a moving stream of thermally ionized and electrically conductive gas between opposed electrodes carried by opposed walls of said duct and through magnetic flux at said electrodes substantially normal to the plane of said electrodes and the direction of flow of said gas, a thin substantially flat vane spaced a distance from a wall carrying said electrodes equal to about one fourth the length of said vane in the downstream direction, said vane being normal to the said plane of electrodes and having opposite sides in the thickness dimension equally convergent in the downstream direction, said vane being directed downstream and toward said electrodes to provide a maximum lift to drag ratio and containing coolant passages, means for supporting said vane in said duct, and means for passing a coolant through said coolant passages.

References Cited by the Examiner
UNITED STATES PATENTS

| | | |
|---|---|---|
| 2,901,023 | 8/1959 | Brola. |
| 2,974,488 | 3/1961 | Eggers _____ 60—39.74 X |
| 3,154,703 | 10/1964 | Zahavi _____ 310—11 |

MILTON O. HIRSHFIELD, *Primary Examiner.*

D. X. SLINEY, *Examiner.*